US00RE42278E

(19) United States
(12) Reissued Patent
Kienzler

(10) Patent Number: US RE42,278 E
(45) Date of Reissued Patent: Apr. 12, 2011

(54) HANDLE FOR SCREWDRIVERS

(75) Inventor: Werner Kienzler, Schonach (DE)

(73) Assignee: WIHA Werkzeuge GmbH, Schonach (DE)

(21) Appl. No.: 29/266,846

(22) Filed: Sep. 26, 2006

Related U.S. Patent Documents

Reissue of:
(64) Patent No.: Des. 523,315
Issued: Jun. 20, 2006
Appl. No.: 29/232,314
Filed: Jun. 16, 2005

(30) Foreign Application Priority Data

Dec. 20, 2004 (EM) ..... 000 271 564

(51) LOC (9) Cl. ..... 08-05
(52) U.S. Cl. ..... D8/82; D8/107
(58) Field of Classification Search ..... D8/20–29, D8/55, 93, 98–100, 102–107, 300, 301, 303, D8/307, 310, 312, 319–320, 376–378, 400–499; D4/132–138; D7/393, 395, 401.1, 401.2, D7/646, 695; D22/104, 118, 207; D24/207; D6/524; D26/154; D9/443; 15/143.1, 159.1, 15/160, 168, 175, 194.1, 192; 81/177.1–177.9, 81/489, 3.2, 436, 439–440, 60–63.2, 477, 81/479, 52; 16/427, 422, 436, 110.1, 421, 16/430–431, 429, 441, 124.6, 414, 417, DIG. 18, 16/DIG. 19; 73/862.23; 30/164.5, 151–162; 211/87.01; 428/28
See application file for complete search history.

(56) References Cited

U.S. PATENT DOCUMENTS

D441,269 S * 5/2001 Tsai ..... D8/83
D468,182 S * 1/2003 Thompson ..... D8/83
D475,268 S * 6/2003 Lisle et al. ..... D8/107
D485,482 S * 1/2004 Romanski et al. ..... D8/83
D486,050 S * 2/2004 Rampen ..... D8/83
D487,387 S * 3/2004 Chen ..... D8/107
6,749,790 B1 * 6/2004 Lieser et al. ..... 264/279
D494,038 S * 8/2004 Shih ..... D8/107
D494,443 S * 8/2004 Saunders ..... D8/107

* cited by examiner

*Primary Examiner*—Philip S Hyder
*Assistant Examiner*—Barbara Fox
(74) *Attorney, Agent, or Firm*—Muirhead and Saturnelli, LLC

(57) CLAIM

The ornamental design for a handle for screwdrivers, as shown and described.

DESCRIPTION

FIG. 1 is a [first] perspective view of a handle for screwdrivers showing the new design;
FIG. 2 is a front end view thereof;
FIG. 3 is a top view thereof;
FIG. 4 is a side view thereof;
FIG. 5 is a bottom end view thereof; and,
FIG. 6 is a rear end view thereof.

1 Claim, 2 Drawing Sheets

Figure 1:
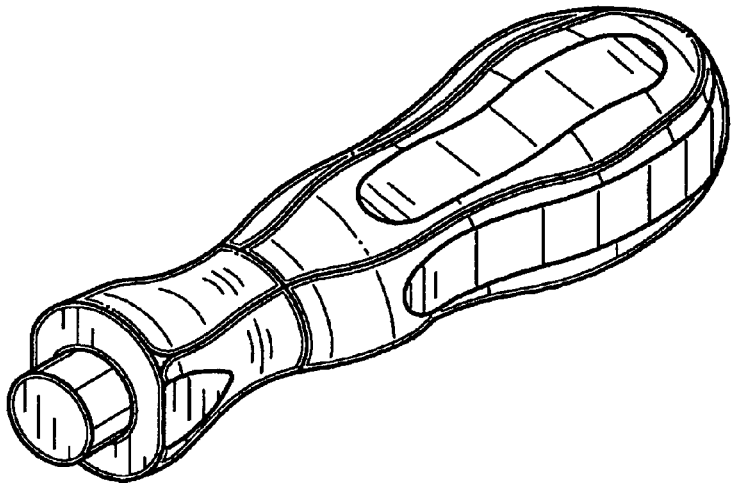
Figure 2:
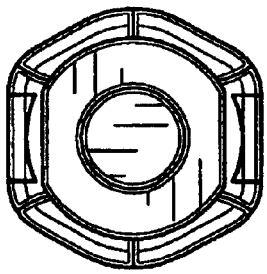
Figure 3:
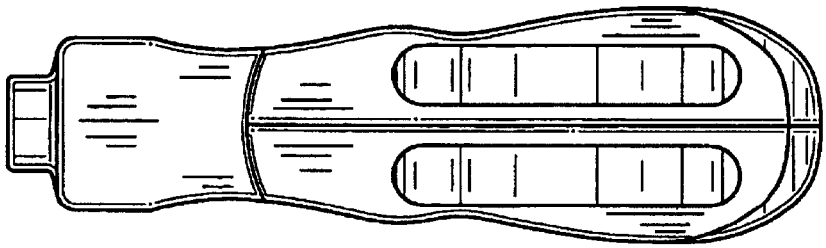
Figure 4:
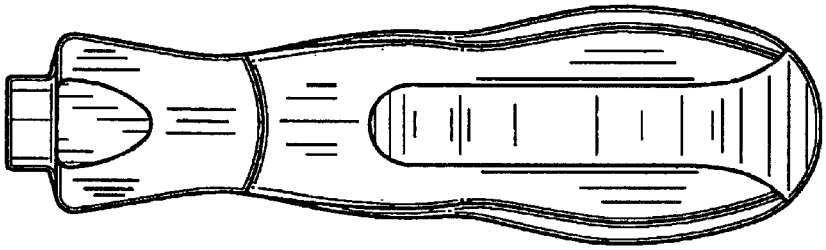
Figure 6:
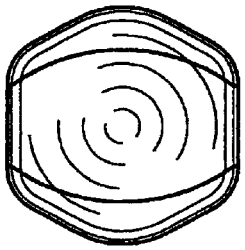
Figure 5:
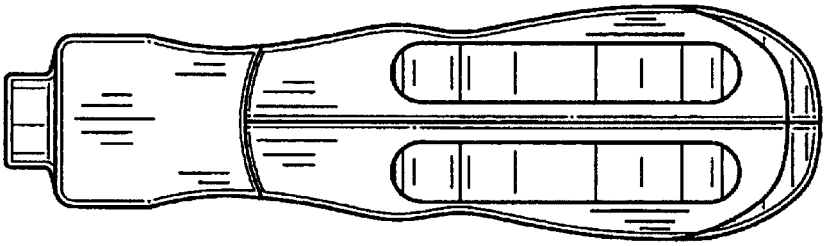

Matter enclosed in heavy brackets [ ] appears in the original patent, but forms no part of this reissue; matter printed in italics indicate the additions made by reissue.